Sheet 1.
2 Sheets.
W. Ager.
Grain Cleaner.
No. 3788. Reissued Jan. 11. 1870
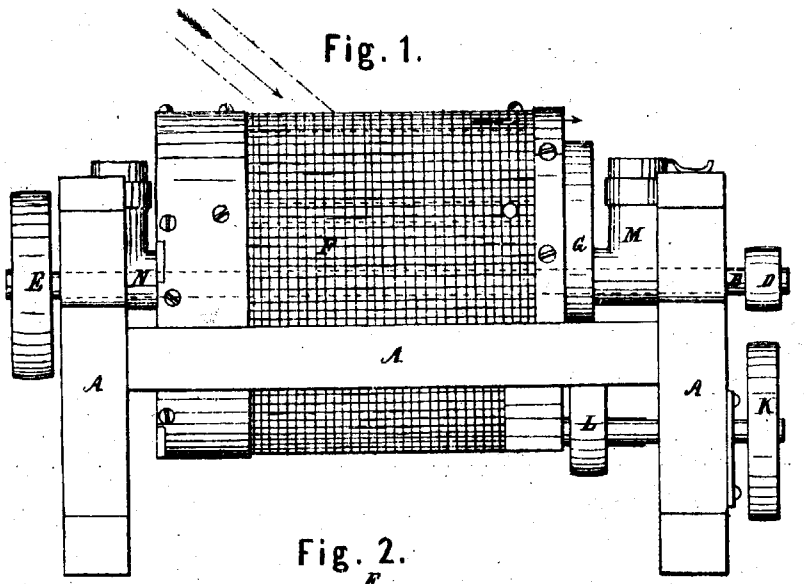
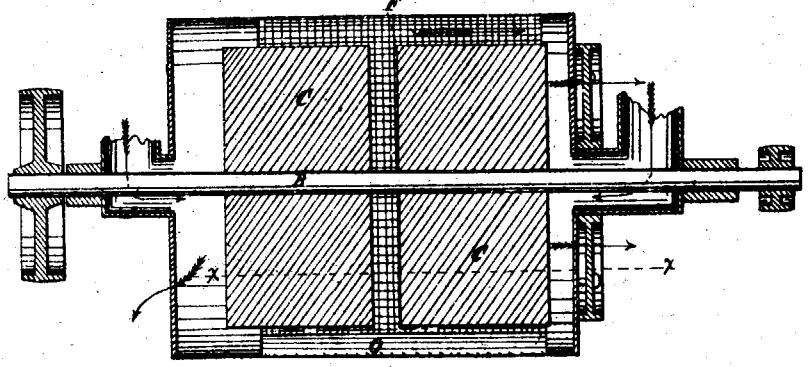
Witnesses.
Austin B Paige
Wm H Seaman
Inventor.
Wilson Ager
per Daniel Breed
Atty.

W. Ager.
Grain Cleaner.

No. 3,788. Reissued Jan. 11. 1870.

Witnesses.
Austin B. Paige
Wm. H. Seaman

Inventor.
Wilson Ager
per Daniel Breed
Atty.

UNITED STATES PATENT OFFICE.

WILSON AGER, OF WASHINGTON, DISTRICT OF COLUMBIA.

IMPROVEMENT IN GRAIN-CLEANERS.

Specification forming part of Letters Patent No. 92,556, dated July 13, 1869; reissue No. 3,788, dated January 11, 1870.

DIVISION A.

*To all whom it may concern:*

Be it known that I, WILSON AGER, of Washington, District of Columbia, have invented a new and useful Improvement in Decorticating-Machines; and I do hereby declare that the following is a full and exact description of the same, reference being had to the accompanying drawings and to the letters of reference marked thereon.

Figure 3:
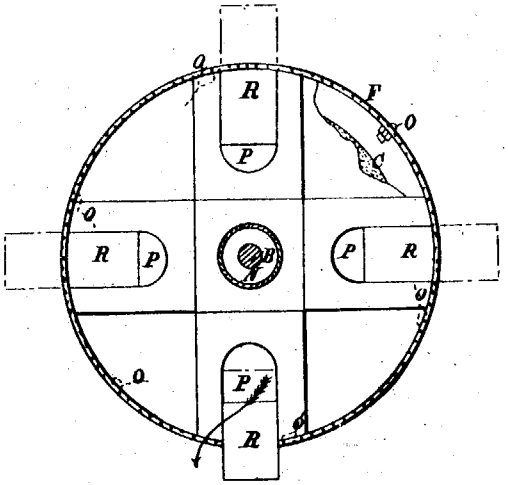
Figure 4:
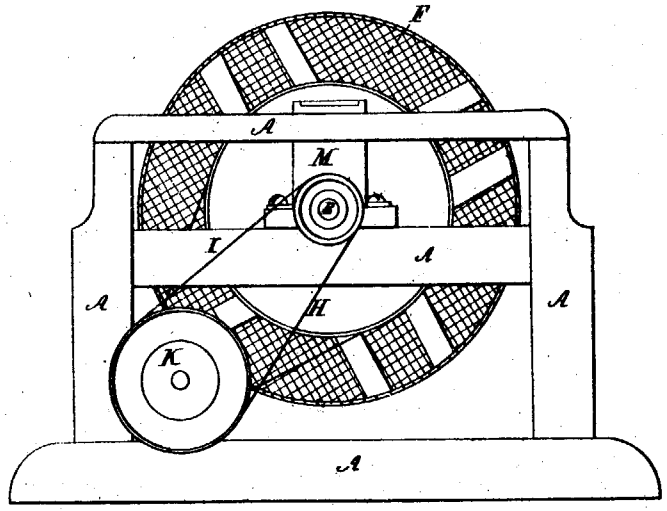

In the accompanying drawings, Figure 1 is a side view of my machine for cleaning grain. Fig. 2 is a longitudinal section of the same. Fig. 3 is a detached view of the screen, showing the discharge-openings and slides, and also one of the grain-elevators. Fig. 4 is an end view of the machine.

In these drawings the outer case is not represented, but this case may be of any ordinary construction.

My invention consists of keeping the friction-surfaces of the machine cool, and also in separating and removing the dust from the grain as fast as this dust and cuticle become loosened from the kernels by means of a blast of air passing through the machine. This process or mode of operation may be employed in the following-described machine, or by any other suitable machine. Upon a suitable frame, A, is placed a horizontal shaft, B, carrying two stones, C, and provided with two pulleys, D and E, or two gear-wheels. Upon this shaft is the screen F, having journals separate from those of the stones and main shaft, and a pulley and gear-wheel, G. Power is applied to the gear-wheel D, setting in motion the shaft A, stones C, and pulley or gear-wheel E, say, about one hundred and eighty revolutions per minute.

By means of the bands H and I, and the pulleys or gear-wheels K, L, and M, a slower motion is transmitted to the screen, say about thirty revolutions to the minute; or the screen may be revolved in the direction opposite to the stones, if desired. The grain is fed in through tube M and the hollow shaft of the screen, as indicated by arrows *m*. The grain spreads through the machine, and is raised by elevators O. A constant blast of air is brought into the machine, as indicated by arrows *n*, or in any other suitable manner, to blow out of the machine all the separated cuticle and dust, as soon as they are detached from the kernels.

The blast may be introduced into this machine by means of a fan, in the common way; or a current of air may be produced by a suction-fan, or any other suitable means. When the decortication is completed, the grain is discharged through openings P, Fig. 3, provided with adjustable slides R.

In this patent I do not claim the machine, as I have a separate patent for the machine, and here confine myself to the process, which may be used with any suitable machine.

Having described my invention, I claim—

The use of a blast or current of air to cool the friction-surfaces of a machine while decorticating grain, and to remove the separated cuticle and dust from the machine, immediately after the same are detached from the kernels, substantially in the manner as herein described.

WILSON AGER.

Witnesses:
WM. H. SEAMAN,
DANIEL BREED.